United States Patent
Rangam (10) Patent No.: US 6,901,528 B2
(45) Date of Patent: May 31, 2005

(54) MINIMUM LATENCY PROPAGATION OF VARIABLE PULSE WIDTH SIGNALS ACROSS CLOCK DOMAINS WITH VARIABLE FREQUENCIES

(75) Inventor: Kasturiranga Rangam, Santa Clara, CA (US)

(73) Assignee: LSI Logic Corporation, Milpitas, CA (US)

( * ) Notice: Subject to any disclaimer, the term of this patent is extended or adjusted under 35 U.S.C. 154(b) by 536 days.

(21) Appl. No.: 10/184,331

(22) Filed: Jun. 25, 2002

(65) Prior Publication Data

US 2003/0237014 A1 Dec. 25, 2003

(51) Int. Cl.[7] .............................. G06F 1/04; G06F 1/06; G06F 1/08
(52) U.S. Cl. .................... 713/501; 713/502; 326/96
(58) Field of Search ................................ 713/400, 500, 713/501, 502; 326/90; 327/116, 114, 145, 151, 160, 176

(56) References Cited

U.S. PATENT DOCUMENTS

| | | | | |
|---|---|---|---|---|
| 6,172,538 B1 | * | 1/2001 | Selwan | 327/141 |
| 6,260,152 B1 | * | 7/2001 | Cole et al. | 713/400 |
| 6,359,479 B1 | * | 3/2002 | Oprescu | 327/141 |
| 6,362,668 B1 | * | 3/2002 | Lutley et al. | 327/113 |
| 6,799,280 B1 | * | 9/2004 | Edenfield et al. | 713/400 |

* cited by examiner

*Primary Examiner*—Thomas Lee
*Assistant Examiner*—Vincent Tran
(74) *Attorney, Agent, or Firm*—Christopher P. Maiorana, P.C.

(57) ABSTRACT

An apparatus comprising a counter circuit, a first register circuit, a second register circuit and an output circuit. The counter circuit may be configured to generate a count signal in response to a data input signal and a first clock signal operating in a first clock domain. The first register circuit may be configured to generate a first control signal in response to the count signal. The second register circuit may be configured to generate a second control signal in response to the data input signal. The output circuit may be configured to generate a data output signal operating in a second clock domain in response to the first control signal, the second control signal, the count signal, and a second clock signal.

20 Claims, 6 Drawing Sheets

MINIMUM LATENCY PROPAGATION OF VARIABLE PULSE WIDTH SIGNALS ACROSS CLOCK DOMAINS WITH VARIABLE FREQUENCIES

FIELD OF THE INVENTION

The present invention relates to signal transfer devices generally and, more particularly, to a minimum latency propagation of variable pulse width signals across clock domains with variable frequencies.

BACKGROUND OF THE INVENTION

Control signals are often implemented using pulse width modulation. The width of the pulse is usually an integer multiple of the period of a clock cycle in the domain in which the control signal was manifested. These control signals are most easily transferred between circuits using pre-existing busses. However, if the clock frequency of a bus is not some integer multiple of the circuit in which the control signal was originated, maintaining the same pulse width is a problem. Conventional approaches synchronize signals using two back to back registers. However, the pulse width of the control signal is not maintained.

It would be desirable to transfer a control signal pulse of variable pulse width from one clock domain to another with minimum latency while maintaining the pulse width in terms of number of clocks in the first clock domain.

SUMMARY OF THE INVENTION

The present invention concerns an apparatus comprising a counter circuit, a first register circuit, a second register circuit and an output circuit. The counter circuit may be configured to generate a count signal in response to a data input signal and a first clock signal operating in a first clock domain. The first register circuit may be configured to generate a first control signal in response to the count signal. The second register circuit may be configured to generate a second control signal in response to the data input signal. The output circuit may be configured to generate a data output signal operating in a second clock domain in response to the first control signal, the second control signal, the count signal, and a second clock signal.

The objects, features and advantages of the present invention include providing a method and/or apparatus for propagating a signal having a pulse width that may (i) have low latency, (ii) have functionality with varied frequencies of source and destination clocks; and/or (iii) have functionality with varied pulse widths.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
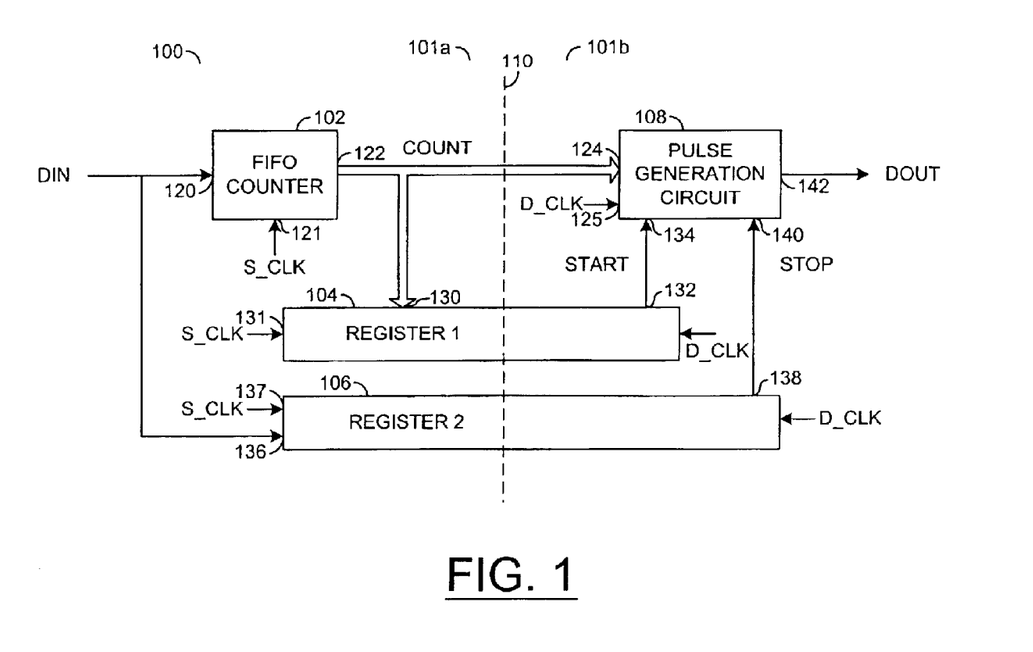
FIG. 1 is a block diagram of the preferred embodiment of the present invention.

Referring to FIG. 1, a block diagram of a circuit 100 is shown in accordance with a preferred embodiment of the present invention. The circuit 100 generally comprises a source time (or frequency) domain 101a and a destination domain 101b. The circuit 100 generally comprises a counter block (or circuit) 102, a register block (or circuit) 104, a register block (or circuit) 106 and an output block (or circuit) 108. The counter circuit 102 may be implemented having one or more first-in first-out (FIFO) circuits. In one example, the counter 102 may be implemented as a FIFO counter. The output circuit 108 may be implemented as a pulse generation circuit. A dotted line 110 generally defines a boundary between the first clock domain 101a and the second clock domain 101b. All of the circuits in the domain 101a generally receive a source clock signal (e.g., S_CLK) and all of the circuits in the domain 101b generally receive the destination clock signal (e.g., D_CLK).

The counter circuit 102 may have an input 120 that may receive an input signal (e.g., DIN), an input 121 that may receive the signal S_CLK and an output 122 that may present a signal (e.g., COUNT) to an input 124 of the pulse generation circuit 108. The input signal DIN may be a data input signal. In another example, the signal DIN may be implemented as a control signal. However, the signal DIN may be implemented as any appropriate type of signal to meet the design criteria of a particular application. The signal S_CLK may be implemented as a clock signal. The signal S_CLK is generally the first clock domain clock signal. The output 122 signal COUNT may be implemented as a count signal. The number of layers (or levels) of FIFO counter depth implemented in the counter 102 generally depends on the ratio of a frequency of the signal S_CLK to the signal D_CLK. An appropriate number of levels of FIFOs are generally implemented such that the circuit 100 avoids a stall condition during normal operation.

The counter 102 may be implemented as a multi-layer (or multi-level) FIFO counter each level having a sufficient width to store a value (e.g., the signal COUNT) that corresponds to one or more pulses (or cycles) of the signal S_CLK that correspond to one or more pulses of the signal DIN. In one example, the FIFO counter 102 may store (or hold) a value (or number) that corresponds to pulses of the signal S_CLK that corresponds to 2 pulses of the signal DIN. The counter 102 may be implemented as a two layer deep FIFO counter with each layer (or level) configured to count and/or hold a value corresponding to a number of pulses of the signal S_CLK for each respective pulse of the signal DIN. However, the counter 102 may be implemented to store any number of cycles of the signal S_CLK that correspond to any appropriate number of pulses of the signal DIN (e.g., having any appropriate width and/or depth of layers) to meet the design criteria of a particular application.

The register circuit 104 may have an input 130 that may receive the count signal COUNT, an input 131 that may receive the signal S_CLK, and an output 132 that may present a control signal (e.g., START) to an input 134 of the pulse generation circuit 108. The signal START may be implemented as a start signal that may begin (or initiate) a start of a pulse generation.

The register 106 may have an input 136 that may receive the data input signal DIN, an input 137 that may receive the signal S_CLK, and an output 138 that may present a control signal (e.g., STOP) to an input 140 of the pulse generation circuit 108. The pulse generation circuit 108 may have an input 125 that may receive the signal D_CLK and an output 142 that may present a signal (e.g., DOUT). The signal DOUT may be implemented as a data (or control) output signal. The signal STOP may initiate an end of a pulse generation. The pulse generation circuit 108 may be configured to generate the signal DOUT in response to the signal START, the signal STOP, the signal D_CLK, and the signal COUNT. In one example, the pulse generation circuit 108 may have an internal counter (described in connection with FIG. 5) that may generate a value that may be compared with the signal COUNT to de-assert the signal DOUT.

Figure 2:
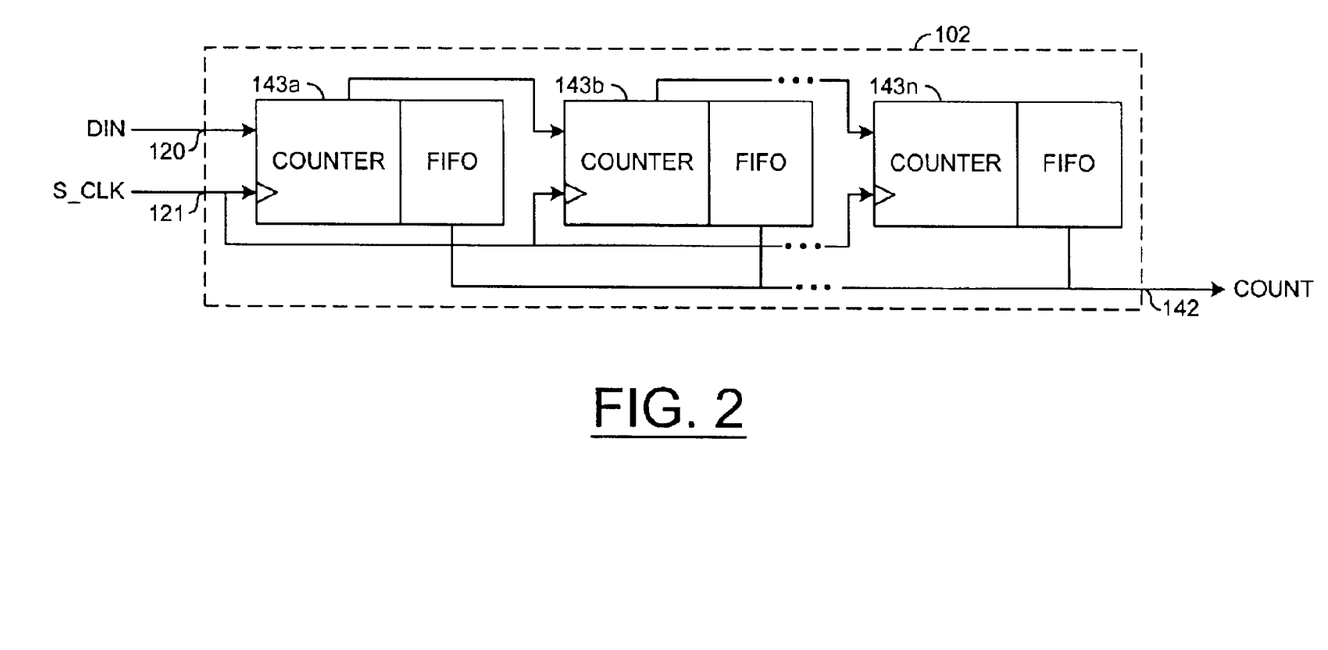
FIG. 2 is a more detailed diagram of the counter of FIG. 1.

Referring to FIG. 2, a more detailed diagram of the counter 102 is shown. The multi-layer (and/or multi-depth) FIFO counter circuit 102 generally comprises one or more serially cascaded FIFO counters 143 (e.g., FIFO counters 143a–143n). Each FIFO counter 143 generally comprises a counter portion that may be configured to count the respective number of LOW to HIGH edge transitions (or pulses) of the signal S_CLK for an appropriate number cycles of the signal DIN. The circuits 143 are generally layered (e.g., an appropriate number of the circuits 143 may be implemented) such that an appropriate number of values of the signal COUNT may be held in the respective FIFO portions for the signal DOUT to be properly generated via the circuit 100. The signal DOUT may be generated having the source (e.g., an equal) pulse width with respect to the signal D_CLK and the respective signal DIN has with respect to the signal S_CLK.

Figure 3:
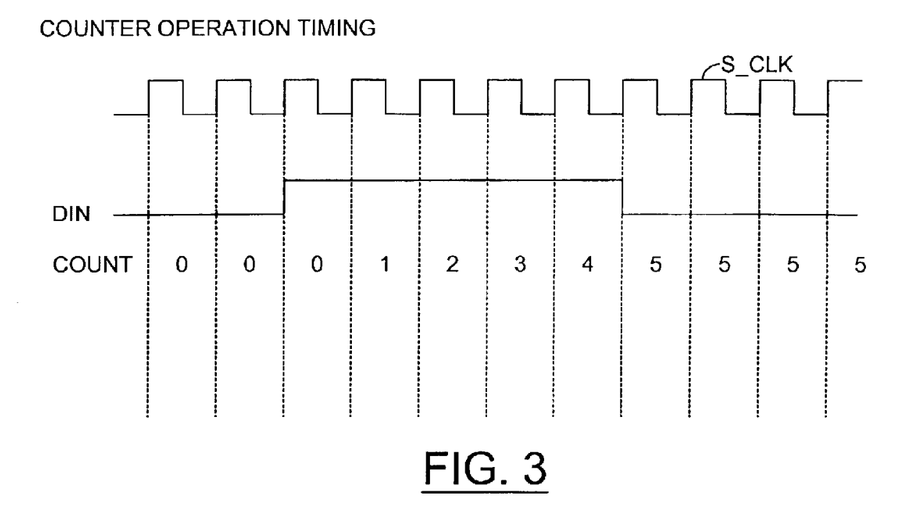
FIG. 3 is a timing diagram illustrating the operation of the counter of FIG. 2.

Referring to FIG. 3, a timing diagram illustrating an example of the operation of the counter 102 is shown. The clock signal in the first clock domain (e.g., the signal S_CLK) may be represented by a square wave waveform, the data (or control) signal DIN presented at input 120 may be represented as another square wave waveform, and the counter output signal presented at output 122 (e.g., the signal COUNT) may be represented by a numeric stream. The count value COUNT may remain at zero until the signal DIN makes a transition to a HIGH (e.g., 1 or on) logic level. When the signal DIN is in a HIGH logic state (e.g., a pulse width is being asserted) the output value COUNT may increment by an integer value of positive one for every clock cycle of the clock signal S_CLK (e.g., each LOW to HIGH transition of the first domain clock signal S_CLK). When the signal DIN makes a transition to a LOW logic level, the counter value COUNT may be held until the respective FIFO portion of the counter 102 is reset (or rolls over). The example of FIG. 3 illustrates a pulse width of five clock cycles S_CLK being presented at the input 121 and the associated value of the signal COUNT of the output 122 for each pulse (or cycle) of the signal DIN. However, a particular signal DIN may have any appropriate width corresponding to a respective number of cycles (or pulses) of the signal S_CLK. The circuit 100 may be configured such that the signal DOUT is presented having the same relative pulse width (e.g., the same number of pulses of the signal D_CLK) as the respective signal DIN. The signal pulse width ratio may be preserved as the signal propagates across the clock domains 101a to 101b.

Figure 4:
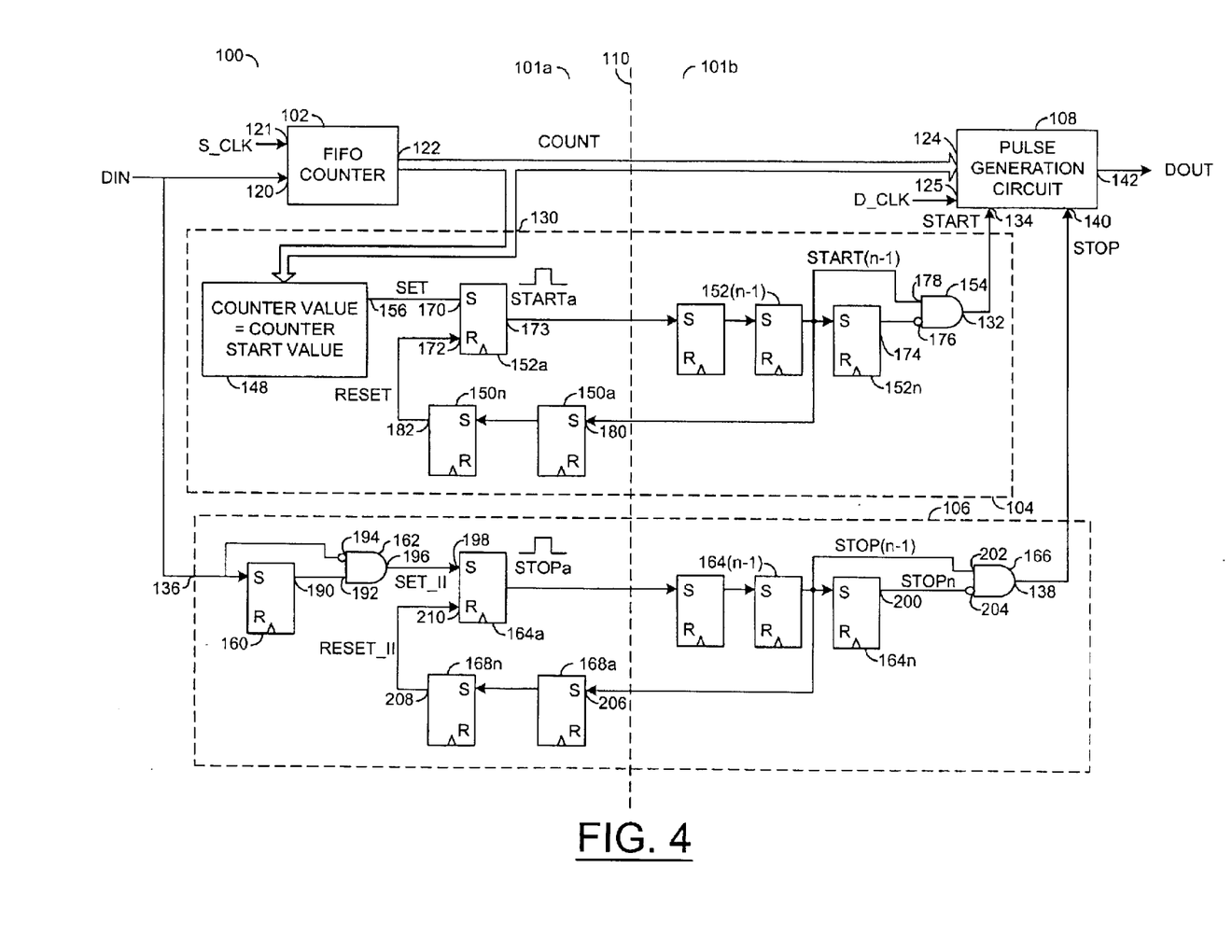
FIG. 4 is a more detailed diagram of the circuit of FIG. 1 illustrating the preferred embodiment of registers 1 and 2.

Referring to FIG. 4, a more detailed diagram of the circuit 100 illustrating a preferred embodiment of the registers 104 and 106 is shown. The signal DIN may operate in the first clock domain (e.g., the source clock domain). The signal STOP may operate in the second clock domain. The signal START may also operate in the second clock domain.

The register 104 generally comprises a circuit 148, a number of flip-flops 150a–150n, a number of flip-flops 152a–152n, and a gate 154. The circuit 148 may be implemented as a comparator circuit. The flip-flops 150a–150n and the flip-flops 152a–152n may be implemented as RS flip-flops. However, any appropriate types of flip-flops may be implemented to meet the design criteria of a particular application. The gate 154 may be implemented as an AND gate with an inverted input. However, any appropriate logic and/or combination of logic may be implemented to meet the design criteria of a particular application.

The circuit 148 may have an input 130 that may receive the signal COUNT from the output 122 of the counter 102. The circuit 148 may have an output 156 that may present a signal (e.g., SET) to the flip-flop 152a. The circuit 148 may be configured to compare the signal COUNT to a counter start value (described in more detail below) to initiate a trigger of the flip-flop 152a with the signal SET. The flip-flop 152a may have an input 170 that may receive the signal SET, an input 172 that may receive a signal from the flip-flop 150n and an output 173 that may present a signal (e.g., STARTa). The flip-flops 152a–152n may be cascaded serially, with each successive flip-flop (e.g., the flip-flop 152b) having an input connected to an output of a predecessor flip-flop (e.g., the flip-flop 152a) to form a register.

The flip-flop 152n may comprise the last flip-flop of a serial chain. The flip-flop 152n may have an output 174 that may be connected to an inverting input 176 of the gate 154. The gate 154 may also have an input 178 that may receive a signal (e.g., START(n−1)) from the flip-flop 152(n−1). The gate 154 may present the signal START at the output 132. The flip-flop 150a may have an input 180 that may receive the signal START(n−1) from the flip-flop 152(n−1). The flip-flops 150a–150n may be cascaded serially, with an input from each successive flip-flop (e.g., the flip-flop 150b) connected to an output of a previous flip-flop (e.g., the flip-flop 150a) to form a register. The flip-flop 150n may comprise the last flip-flop of a serial chain. The flip-flop 150n may have an output 182 that may present a signal (e.g., RESET) to the input 172 of the flip-flop 152a.

The register 106 generally comprises a flip-flop 160, a gate 162, a number of flip-flops 164a–164n, a number of flip-flops 168a–168n, and a gate 166. The flip-flops 160, 164a–164n and 168a–168n may be implemented as RS flip-flops. However, any appropriate flip-flops may be implemented to meet the design criteria of a particular application. The gate 162 may be implemented as an AND gate with an inverted input. Similarly, the gate 166 may be implemented as an AND gate with an inverted input. However, any appropriate logic and/or combination of logic may be implemented to meet the design criteria of a particular application.

The flip-flop 160 may have an output 190 that may be connected to an input 192 of the gate 162. The gate 162 may also have an inverted input 194 that may receive the signal DIN and an output 196 that may present a signal (e.g., SET_II) to an input 198 of the flip-flop 164a. The flip-flops 164a–164n may be cascaded serially, with each successive flip-flop (e.g., the flip-flop 164b) connected to the output of the previous flip-flop (e.g., the flip-flop 164a) to form a register. The flip-flop 164n may comprise the last flip-flop of a serial chain. The flip-flop 164n may have an output 200 that may present a signal (e.g., STOPn) to the inverted input 204 of the gate 166. The gate 166 may have an input 204, an input 202 that may receive a signal (e.g., STOP(n−1)) from the flip-flop 164(n−1), and an output 138 that may present the signal STOP.

The flip-flops 168a–168n may be cascaded serially, with the input of each successive flip-flop (e.g., flip-flop 168b) connected to the output of each predecessor flip-flop (e.g., flip-flop 168a) to form a register. The flip-flop 168a may have an input 206 that may receive the signal STOP(n−1) from the output of the flip-flop 164(n−1). The flip-flop 168n may comprise the last flip-flop of a serial chain. The flip-flop 168n may have an output 208 that may provide a signal (e.g., RESET_II) to input 210 of flip-flop 164a. Each of the circuits of the source clock S_CLK domain 101a (e.g., the circuits 102, 148, 152a, 150, 160, 164a, 168, etc.) generally receives the source clock signal S_CLK at a respective clock input. Similarly, each of the circuits in the destination clock D_CLK domain 101b (e.g., the circuits 108, 152b–152n, 164b–164n, etc.) generally receives the destination clock signal D_CLK at a respective clock input.

The circuit 106 is generally implemented having the same number of flip-flops 164 as the number of flip-flops 152 that are implemented in the circuit 104. Similarly, the circuit 106 is generally implemented having the same number of flip-flops 168 as the number of flip-flops 150 that are implemented in the circuit 104. The number of flip-flops 150 and 152 (and 164 and 168) is generally selected to generate minimum latency in the generation of the signal DOUT while providing adequate delay such that the signals DIN and DOUT may be synchronized during normal operating conditions. The number of flip-flops that comprise the registers 104 and 106 may be selected (e.g., adjusted, determined, etc.) such that the size of the registers 104 and 106 may be altered (or set) to adjust propagation delay through registers 104 and 106.

The maximum number of cycles (or transitions) of the source clock signal S_CLK for a signal DIN to change from 0 to 1 to propagate from the source clock S_CLK domain to the destination clock may be calculated (or determined) to set (or program) the value of the signal START. The maximum frequency of the source clock and minimum frequency of the destination clock D_CLK may be applied by a user to perform this calculation. The value of the counter 102 start value generally corresponds to the integral or next integral value of the ratio of the frequency of the signal S_CLK to the signal D_CLK (e.g., (S_CLK/D_CLK) % 2). The counter start value is generally programmable. Programming bits (not shown) are generally implemented in the circuits 102 and 148 such that a user may implement the appropriate value for the counter start value. For example, the first FIFO counter circuit 143 (e.g., the circuit 143a) in the FIFO counter 102 (i) may be configured to start counting (e.g., incrementing) in response to pulses (or transitions) of the source to main clock signal S_CLK when there is a 0 to 1 transition of the signal DIN and (ii) may be configured to stop counting when there is a 1 to 0 transition of the signal DIN. The signal START may be generated by the register 104 when the counter 102 reaches the predetermined counter start value or when there is a 1 to 0 transition of the signal DIN, whichever occurs first. The signal START may then be synchronized to the destination clock domain 101b via the registers 104 and 106 (e.g., the signals SET and/or RESET and DIN).

The signal START may change the state of the signal DOUT in the destination clock D_CLK domain 101b from 0 to 1 and simultaneously start incrementing a counter in the circuit 108 (described in connection with FIG. 5). When there is a 1 to 0 transition of the signal DIN within source clock S_CLK domain 101a, the signal STOP may be generated and propagated to the destination clock domain.

The signal STOP may be configured to initiate a latch of the counter value (e.g., pulse width that corresponds to the signal COUNT) from the source clock domain 101a into the destination clock domain 101b (e.g., the FIFO portion of the FIFO counter 143a may present the signal COUNT). The signal DOUT in the destination clock domain 101b may transition from 1 to 0 after the counter in the circuit 108 reaches the respective pulse width value. Meanwhile, the second FIFO counter 143b in the FIFO counter 102 in the source clock domain 101a may monitor the signal DIN to determine another 0 to 1 transition of the signal DIN. The counter 102 may be implemented to store two pulses (e.g., implemented to have two of the circuits 143) since a third pulse in the source clock domain 101a is generally not started until acknowledgment of completion of the first pulse in the destination clock domain 101b is received (e.g., the signal DOUT makes a transition from HIGH to LOW). The depth of the FIFO counter 102 may be implemented at any appropriate level (e.g., number of layers or circuits 143) depending on how many pulses of the signal DIN are generated before receiving an acknowledgment from the destination clock domain 101b. The counter 102 size is generally adjusted depending on (e.g., corresponding to) the maximum pulse width of the signal DIN that is transmitted during normal operation.

Figure 5:
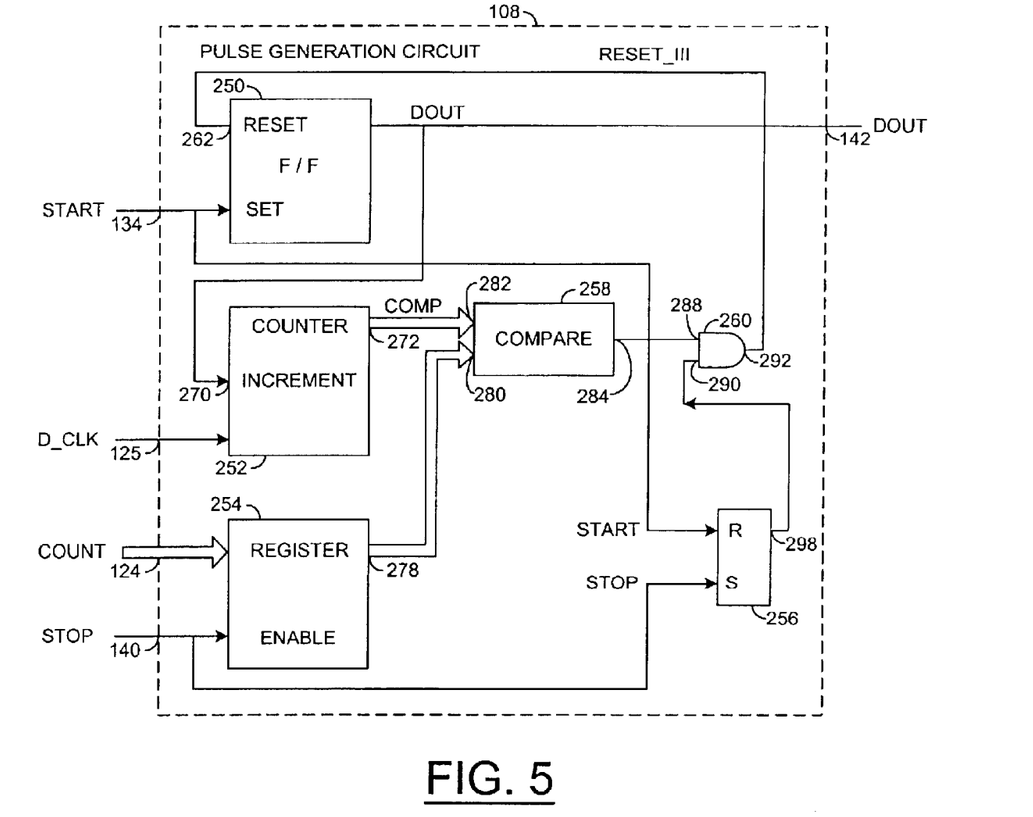
FIG. 5 is a more detailed diagram of the pulse generation circuit of FIG. 1.

Referring to FIG. 5, a more detailed diagram of the pulse generation circuit 108 is shown. The pulse generation circuit generally comprises a flip-flop 250, a counter 252, a register 254, a comparator 258, a flip-flop 256, and a logic gate 260. The flip-flops 250 and 256 may be implemented as RS flip-flops and the logic gate 260 may be implemented as an AND gate. However, any appropriate logic and/or combinations of logic may be implemented to meet the design criteria of a particular application.

The flip-flop 250 may have an input 134 that may receive the control signal START, an input 262 that may be coupled to the logic gate 290 output 292 and an output 142 that may present the data signal DOUT. The counter 252 may have an increment input 270 that may receive the signal DOUT from the flip-flop 250 output 142, an input 125 that may receive the clock signal D_CLK and an output 272 that may present a signal (e.g., COMP) to the comparator 258. The counter 252 generally increments the value COMP in response to pulses of the signal DOUT and the clock signal D_CLK. The register 254 may have an input 124 that may receive the signal COUNT, an enable input 140 that may receive the control signal STOP, and an output 278 that may present a signal to the input 280 of the comparator 258. The circuit 254 may be configured to latch the value COUNT in response to the signal STOP.

The circuit 258 generally compares the signals COUNT and COMP. When the signal COMP equals the signal COUNT the output of the circuit 258 is generally a logical HIGH. The comparator 258 may have an input 282 that may receive a signal from the output 272 of counter 252 and an input 280 that may receive the signal from the output 278 of the register 254. The comparator 258 may have an output 284 that may be coupled to the input 288 of logic gate 260. The flip-flop 256 may have an input 140 that may receive the control signal STOP, an input 134 that may receive the control signal START, and an output 298 that may provide a signal to the input 290 of the logic gate 260. The logic gate 260 may have an output 292 that provides a signal (e.g., RESET_III) to the input 262 of flip-flop 250. The circuit 260 may be configured to assert the signal RESET_III (e.g., initiate a 1 to 0 transition of the signal DOUT) when the signal DOUT has a pulse width (e.g., pulses of the signal D_CLK) that is equal to the pulse width (e.g., pulses of the signal S_CLK) of the respective signal DIN.

Figure 6:
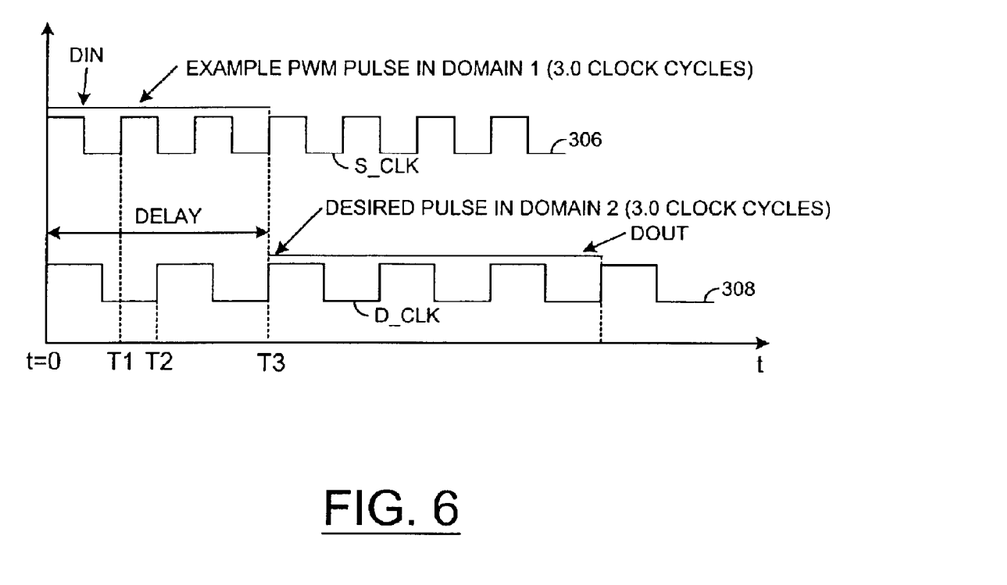
FIG. 6 is a diagram of an example of a pulse width transferred between two clock domains with different frequencies.

Referring to FIG. 6, a diagram illustrating an example of a pulse width in each clock domain is shown. A clock signal (e.g., a waveform 306) in the clock S_CLK domain 101a is synchronized at a start time t=0 with a clock signal 308 (e.g., the clock signal D_CLK) in the clock domain 101b. The first clock domain 101a may have a first period (e.g., T1). The frequency of the first clock domain 101a is generally the inverse of the period (e.g., F1=1/T1). The second clock domain 101b may have a second period (e.g., T2). The frequency of the second clock domain 101b is generally the inverse of the second period (e.g., F2=1/T2). The first frequency F1 is generally not equal to the second frequency F2. In the first clock domain 101a, a pulse width of the signal DIN of 3.0 clock cycles is shown. When transferring the pulse to the second clock domain, the circuit 100 generally maintains the pulse width of 3.0 clock cycles with respect to the second frequency F2, as illustrated. The pulse width of the signal DOUT illustrates the desired output pulse width in the second clock domain 101b. There is generally a delay (e.g., a time t=0 to T3) between the start of a pulse of the signal DIN in the first clock domain 101a and the start of the associated pulse of the signal DOUT in the second clock domain 101b. The value of the signal DIN and the signal DOUT are illustrated changing on the rising edge of their respective clock signals.

The circuit 100 may be implemented in designs having signals traveling from one clock domain (e.g., a faster clock domain) to another clock domain (e.g., a slower clock domain). In one example, the signal DIN is not generally asserted before the signal DOUT has completed the respective pulse generation. When there are two pulses of the signal DIN before the first pulse of the signal DOUT has completed, the FIFO counter 102 may be implemented as a 2-deep FIFO (e.g., configured to store the pulse widths of two pulses of the signal DIN). In this scenario, the signal DIN may not generate a third pulse before the first pulse of the signal DOUT has been generated. The particular number of pulses of the signal DIN (e.g., layers of circuits 143 in the counter 102) may be extended with more levels in the FIFO counter 102.

In an alternative embodiment (not shown), an additional signal from the second clock domain 101b to the first clock domain 101a which pulses each time the signal DOUT completes a pulse generation may be implemented to limit the number of pulses of the signal DIN. Furthermore, the circuit 100 may be implemented where the first clock domain 101a has a lower frequency than the second clock domain 101b. The frequency of the signal START and the signal STOP may be asserted at the same time. Such timing may be controlled by having an additional programming bit (not shown) in the FIFO counter circuit 102.

The various signals of the present invention are generally "on" (e.g., a digital HIGH, or 1) or "off" (e.g., a digital LOW, or 0). However, the particular polarities of the on (e.g., asserted) and off (e.g., de-asserted) states of the signals may be adjusted (e.g., reversed) accordingly to meet the design criteria of a particular implementation. Additionally, inverters may be added to change a particular polarity of the signals.

As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the spirit and scope of the invention.

What is claimed is:

1. An apparatus comprising:
    a counter circuit configured to generate a count signal in response to a data input signal and a first clock signal operating in a first clock domain;
    a first register circuit configured to generate a first control signal in response to said count signal;
    a second register circuit configured to generate a second control signal in response to said data input signal; and
    an output circuit configured to generate a data output signal operating in a second clock domain in response to (i) said first control signal, (ii) said second control signal, (iii) said count signal, and (iv) a second clock signal.

2. The apparatus according to claim 1, wherein said data output signal has a pulse width equal to a pulse width of said data input signal with respect to a number of cycles of said first and second clock signals.

3. The apparatus according to claim 1, wherein said second clock signal operates at a frequency different than said first clock signal.

4. The apparatus according to claim 1, wherein said counter circuit comprises a first-in first-out (FIFO) counter.

5. The apparatus according to claim 4, wherein said counter circuit further comprises a FIFO counter having a depth sufficient to store two pulses of said data input signal.

6. The apparatus according to claim 1, wherein said output circuit comprises a pulse generation circuit.

7. The apparatus according to claim 1, wherein said first control signal starts a generation of said data output signal.

8. The apparatus according to claim 1, wherein said second control signal stops said generation of said data output signal.

9. The apparatus according to claim 1, wherein said apparatus minimizes propagation delay.

10. The apparatus according to claim 1, wherein a size of said first and second registers is adjusted to alter propagation delay.

11. An apparatus comprising:
    means for generating a count signal in response to a data input signal and a first clock signal operating in a first clock domain;
    means for generating a first control signal in response to said count signal;
    means for generating a second control signal in response to said data input signal; and
    means for generating a data output signal operating in a second clock domain in response to (i) said first control signal, (ii) said second control signal, (iii) said count signal, and (iv) a second clock signal.

12. A method for propagating variable pulse width signals across clock domains of variable frequencies comprising the steps of:
    (A) generating a count signal in response to a data input signal and a first clock signal operating in a first clock domain;
    (B) generating a first control signal in response to said count signal;
    (C) generating a second control signal in response to said data input signal; and
    (D) generating a data output signal operating in a second clock domain in response to (i) said first control signal, (ii) said second control signal, (iii) said count signal, and (iv) a second clock signal.

13. The method according to claim 12, wherein said data output signal has a pulse width equal to a pulse width of said data input signal with respect to a number of cycles of said first and second clock signals.

14. The method according to claim 12, wherein said second clock signal operates at a frequency different than said first clock signal.

15. The method according to claim 12, wherein said step (A) further comprises counting with a first-in first-out (FIFO) counter.

16. The method according to claim 15, wherein said FIFO counter has a depth sufficient to store two pulses of said data input signal.

17. The method according to claim 12, wherein said data output signal is generated by a pulse generation circuit.

18. The method according to claim 12, wherein said first control signal starts a generation of said data output signal.

19. The method according to claim 12, wherein said second control signal stops said generation of said data output signal.

20. The method according to claim 12 further comprising the step of:

minimizing propagation delay.

\* \* \* \* \*